United States Patent
Tolleneer et al.

(10) Patent No.: US 8,733,337 B2
(45) Date of Patent: May 27, 2014

(54) HEAT EXCHANGER FOR A HIGH EFFICIENCY HOT AIR HEATING APPLIANCE AND HEATING APPLIANCE EQUIPPED THEREWITH

(75) Inventors: Steven Tolleneer, Brasschaat (BE); Marcel Franciscus J. Verberck, Brasschaat (BE)

(73) Assignee: Multicalor Industries, Naamloze Vennootschap, Mechelen (BE)

( * ) Notice: Subject to any disclaimer, the term of this patent is extended or adjusted under 35 U.S.C. 154(b) by 13 days.

(21) Appl. No.: 13/545,406

(22) Filed: Jul. 10, 2012

(65) Prior Publication Data
US 2013/0014740 A1    Jan. 17, 2013

Related U.S. Application Data

(60) Provisional application No. 61/507,743, filed on Jul. 14, 2011.

(30) Foreign Application Priority Data
Jul. 11, 2011 (BE) .................................... 2011/0440

(51) Int. Cl.
*F24H 3/10* (2006.01)

(52) U.S. Cl.
USPC ........... 126/110 R; 126/106; 165/71; 165/166

(58) Field of Classification Search
USPC ............. 126/110 R, 110 A, 106; 165/71, 166
See application file for complete search history.

(56) References Cited

U.S. PATENT DOCUMENTS

| 5,322,050 A | 6/1994 | Lu |
| 5,439,050 A | 8/1995 | Waterman et al. |
| 5,775,318 A * | 7/1998 | Haydock et al. .......... 126/110 R |
| 6,006,741 A | 12/1999 | Daddis, Jr. et al. |

* cited by examiner

*Primary Examiner* — Alfred Basichas
(74) *Attorney, Agent, or Firm* — Bacon & Thomas, PLLC

(57) ABSTRACT

Heat exchanger for a high efficiency hot air heating appliance (1), with at least one segment (5) and with a primary section (14) and, viewed in the flow direction (A), followed by a secondary condensing section (15), whereby the segment (5) consists of at least one primary element (16) and at least two secondary condensing elements (19), that form part of the secondary condensing section (15) of the segment (5), and the inputs (20) of each of them are connected in parallel to the output (18) of the primary element (16) in such a way that the gas flow coming from the primary element (16) is divided over the secondary condensing elements (19) connected to it.

18 Claims, 8 Drawing Sheets

US 8,733,337 B2

HEAT EXCHANGER FOR A HIGH EFFICIENCY HOT AIR HEATING APPLIANCE AND HEATING APPLIANCE EQUIPPED THEREWITH

This application claims the benefit of provisional application No. 61/507,743 filed Jul. 14, 2011, the entirety of which is incorporated by reference.

FIELD OF THE INVENTION

The present invention relates to a heat exchanger for a high efficiency hot air heating appliance.

Such appliances produce an airflow that is heated in the appliance, and which is used to heat a building for example.

BACKGROUND OF THE INVENTION

Such heating appliances consist, in a known way, of a burner to produce hot combustion gases to heat the airflow, whereby the combustion gases are guided through one or more elements that each form a flow channel with an inlet and outlet for these gases, while the airflow to be heated, for example originating from a fan, is guided along the outside of these elements.

Thereby heat transfer occurs from the combustion gases to the airflow, whereby the temperature of the combustion gases decreases from the inlet to the outlet.

With high efficiency heating appliances, often abbreviated to HE heating appliances, the heat exchanger comprises a primary section, which, viewed in the flow direction of the combustion gases, is followed by a secondary section in which the combustion gases are further cooled by the airflow in order to allow the water vapour in the combustion gases to condense, whereby, as is known, energy is released with which the airflow can be heated.

The efficiency that can be achieved with such a heating appliance is higher than with traditional heating appliances without a secondary section for condensing the water vapour.

An example of a HE heating appliance is described in U.S. Pat. No. 5,322,050. In this case the primary and secondary sections of the heat exchanger are formed as separate units, whereby the primary heat exchanger is composed of S-shaped folded tubes, while the secondary heat exchanger is a 'finned' heat exchanger that consists of tubes on which fins are affixed to increase the heat exchanging surface. Both heat exchangers are connected together by a collector.

A disadvantage of such a heat exchanger is that its assembly is relatively complex and consists of relatively many constituent components.

In U.S. Pat. No. 5,439,050 and U.S. Pat. No. 6,006,741, the primary and secondary heat exchangers are connected together by means of a collector.

A disadvantage of such heat exchangers is that the assembly is difficult to optimise. The primary and secondary heat exchangers must first be manufactured individually and then connected together by means of a separate collector (40 in U.S. Pat. No. 5,439,050).

This collector is relatively expensive as it is generally manufactured from stainless steel.

SUMMARY OF THE INVENTION

The purpose of the present invention is to provide a solution to the aforementioned disadvantages:

the collector that is used to distribute the flue gases from the primary to secondary elements is integrated in these elements, and a separate collector is thus not required;

the assembly is easier to optimise as the primary and secondary heat exchanger are constructed simultaneously.

To this end the invention concerns a heat exchanger for a high efficiency hot air heating appliance, whereby the heat exchanger contains at least one segment that forms a flow channel with an inlet and an outlet for the hot combustion gases and with a primary section and, viewed in the flow direction of the combustion gases, followed by a secondary condensing section, whereby the segment consists of at least one primary element with an input and output that forms part of the primary section of the segment and at least two secondary condensing elements, each with an input and output, that form part of the secondary condensing section of the segment, whereby at least one primary element is constructed as an integrated part of a double element that also contains a secondary condensing element in addition to the primary element, and whereby, at the location of the transition between the primary element and the secondary condensing element of the double element, there is a branch opening to which the inputs of the other secondary condensing elements of the segment are connected in parallel, in such a way that the gas flow coming from the primary element is divided over the secondary condensing elements connected to it, and that flow channels for cold air are formed between the secondary condensing elements.

An advantage of a heat exchanger according to the invention that is modularly composed of primary and secondary elements is that such a heat exchanger is very simple to build and can be tailor-made for the user with two or more secondary condensing elements. The choice of the number of secondary condensing elements can be a consideration between the cost price and the efficiency of the heat exchanger, as the larger the number of secondary condensing elements, the higher the efficiency but also the cost price.

The construction of such a heat exchanger is moreover very simple and can be adapted to the desires of the user in a very simple and flexible way. The number of segments and the number of elements in each segment is easy to adjust.

The simple construction is thus to the benefit of the cost price.

The secondary elements connect directly to the primary element or elements without the intermediary of a collector, such that the cost price is reduced with respect to the models where a collector is needed.

The efficiency of such a heat exchanger is higher than a traditional heat exchanger with a similar power.

Preferably the aforementioned elements are primarily constructed in sheet form and the secondary condensing elements are connected together according to a sandwich structure, the one next to or against the other, such that flow channels are formed between these condensing elements for the air to be heated.

This makes a compact and efficient construction possible.

According to a practical embodiment each of the aforementioned elements is formed as a two-walled whole that consists of two preformed shells that are affixed together to form a flow channel with an aforementioned input and output, whereby the shells are connected together along their edges by a gastight joint, for example by laser welding.

This enables the costs of the production process to be greatly reduced with respect to the known assembly techniques.

In addition the double element can be a two-walled whole composed of two preformed shells that are affixed together to form a flow channel with an input for the primary element, an output for the secondary condensing element and, at the location of the transition between the primary element and the secondary condensing element, a branch opening that acts as an output from the primary element and an input for the secondary condensing element, and to which the inputs of the other secondary condensing elements can be connected in parallel.

Thus an extra gas connection is saved between a primary and secondary element in order to further limit the risk of gas leaks.

In addition one less assembly stage is needed, which further reduces the costs.

Additionally this also fosters the strength of the heat exchanger.

The secondary condensing elements essentially have the same shape and have two opposite essentially straight edges that border the flow channel and which extend up to the output of the secondary condensing element concerned, whereby these edges preferably diverge towards the output, and whereby a drainage channel extends along each edge for the removal of condensation.

This construction enables the heat exchanger to be oriented in many possible positions without the risk of undesired accumulation of condensation in the heat exchanger.

The invention also relates to a high efficiency hot air heating appliance containing a heat exchanger with an inlet and an outlet, a burner opposite the inlet and a fan to blow air over or around the heat exchanger, whereby the appliance contains a heat exchanger as described above.

BRIEF DESCRIPTION OF THE DRAWINGS

With the intention of better showing the characteristics of the invention, a preferred embodiment of a heat exchanger and heating appliance according to the invention is described hereinafter by way of an example, without any limiting nature, with reference to the accompanying drawings, wherein.

DETAILED DESCRIPTION OF A PREFERRED EMBODIMENT

Figure 1:
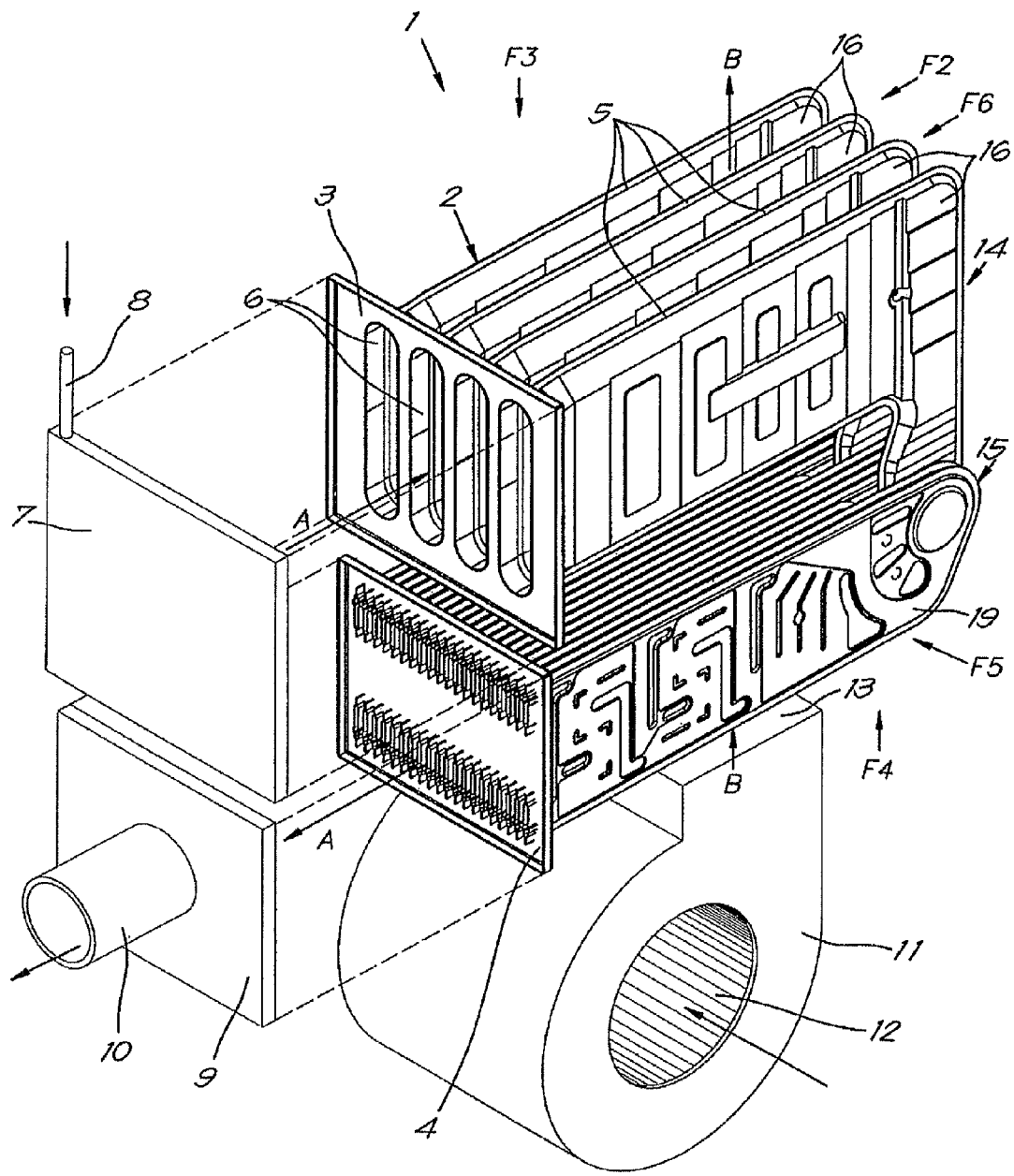
FIG. 1 schematically shows a perspective view of a high efficiency hot air heating appliance with a heat exchanger according to the invention in a removed position.
Figure 2:
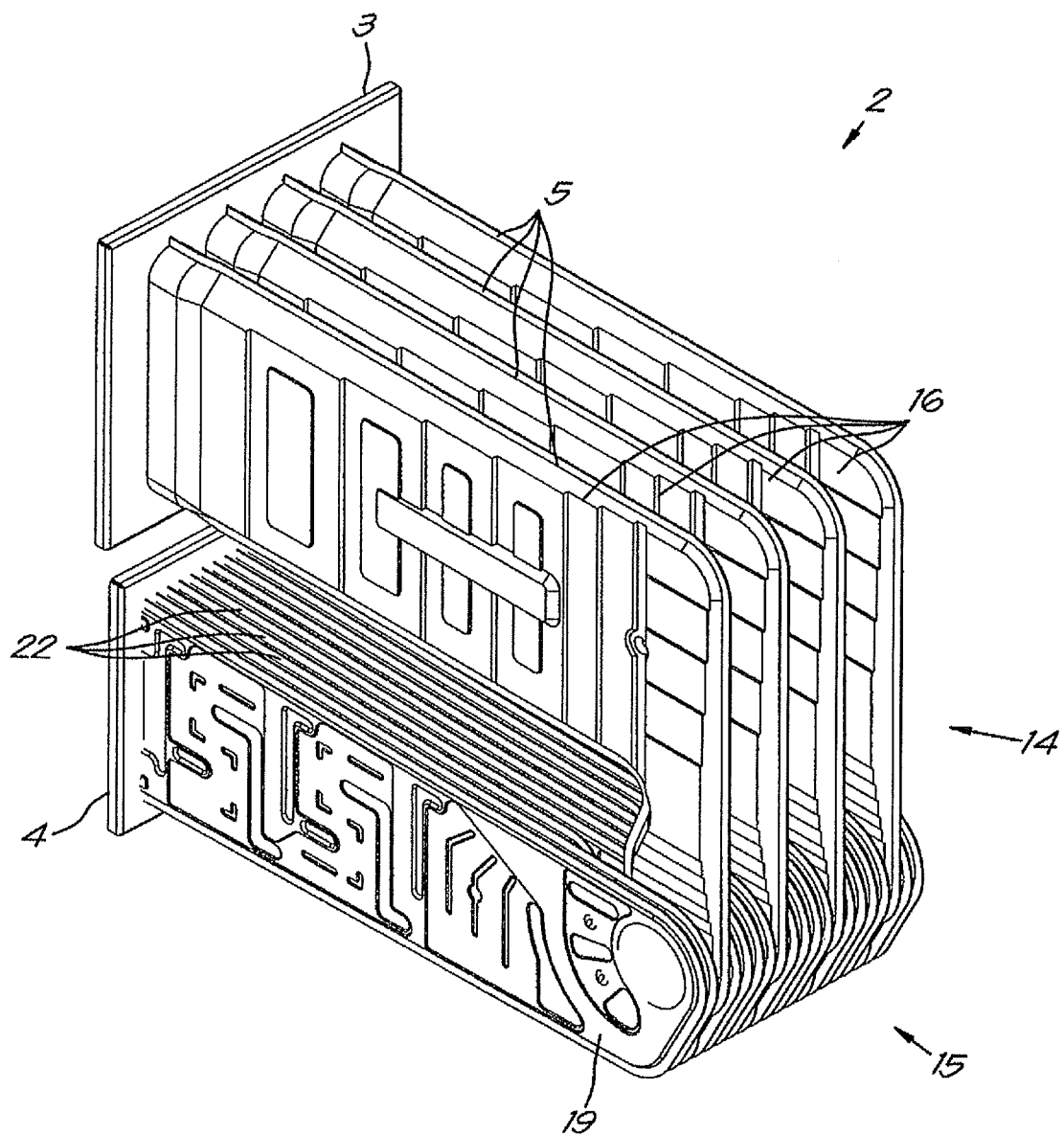
FIGS. 2 to 3 show different views of the heat exchanger of FIG. 1, respectively according to the arrows F2 to F3 in FIG. 1.
Figure 3:
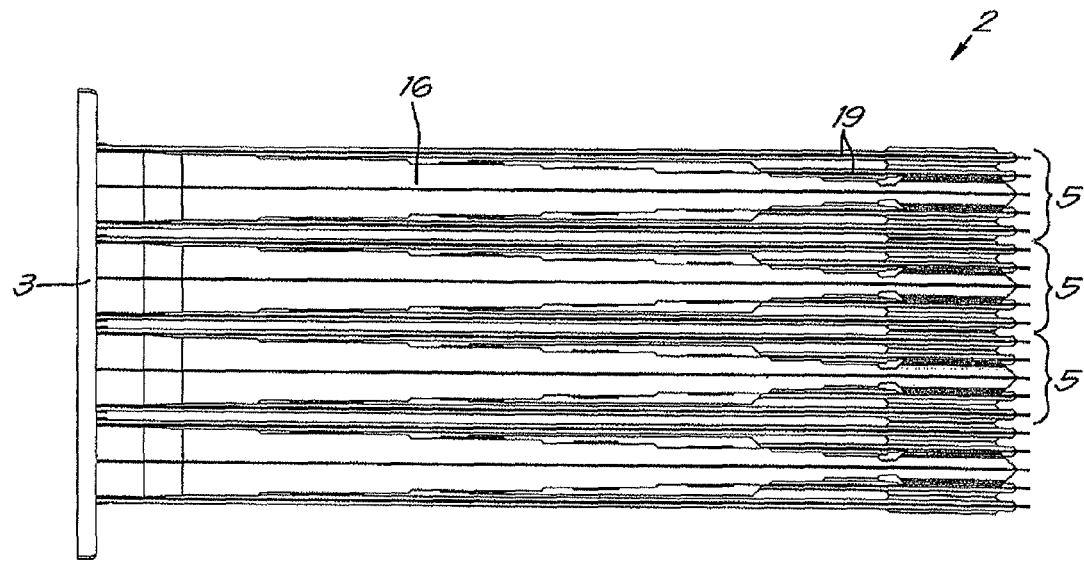
Figure 4:
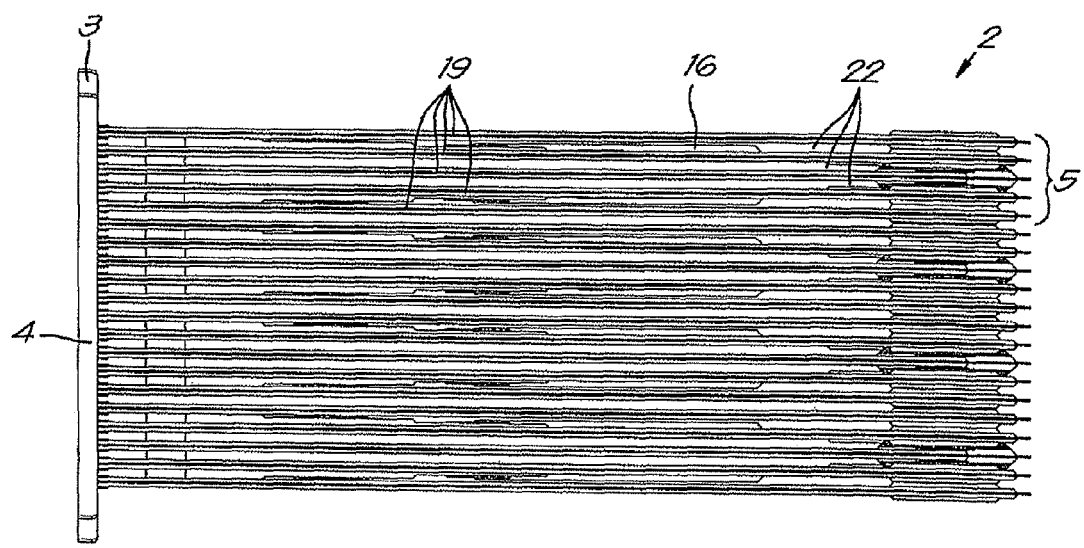
FIG. 4 shows a view of the heat exchanger according to the arrow F4 in FIG. 1.

The high efficiency hot air heating appliance 1 shown in FIG. 1 essentially consists of a heat exchanger 2 that is provided with an inlet 3 and an outlet 4 and which in this case is constructed from a number of segments 5 that each define a flow channel 6; a burner 7 positioned opposite the inlet 3 with a supply 8 for fuel or a mixture of fuel and air for the production of hot combustion gases that are driven through the heat exchanger 2 in the direction of the arrows A; an outlet collector 9 into which the aforementioned outlet 4 flows and which is provided with an exhaust pipe 10 for connection to a chimney or similar.

Furthermore the heating appliance 1 is equipped with a fan 11 that can draw in the surrounding air via an input 12 and which is intended to blow the air drawn in via an outlet 13 over the segments 5 of the heat exchanger 1, as indicated by the arrows B.

In this way the air flowing over the segments 5 is heated, so that the heated air can be used for heating a room or similar.

The hot gases, when flowing through the heat exchanger, are cooled by the airflow B, whereby the temperature of the gas flow A decreases from the inlet 3 to the outlet 4.

The burner 7 can be constructed as an assembly of inshot burners, whereby for each segment fuel and air is injected into the inlet 3 to produce a flame that extends up to a certain distance in the flow channel 6 of the segment 5.

Greater efficiency with fewer harmful emissions is obtained by using a 'premix' burner 7 whereby fuel and air are mixed beforehand and this mixture is ignited.

The heat exchanger is equipped with a primary section 14 that, in the flow direction A of the combustion gases, is followed by a secondary condensing section 15 in which the combustion gases are cooled such that the moisture in the combustion gases is condensed into water. Upon condensing, extra heat is released that is recuperated to heat up the airflow more, which ensures increased efficiency with respect to a heat exchanger without condensing elements. It is also called a high efficiency heating appliance 1.

Figure 6:
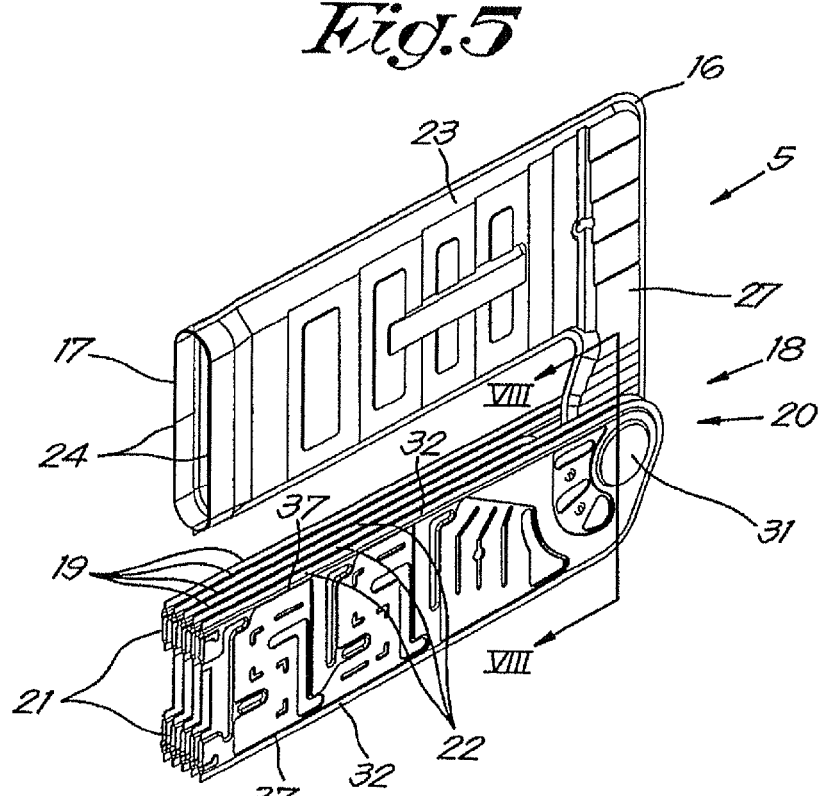
FIG. 6 shows one segment of the heat exchanger of FIG. 1 as indicated by the arrow F6 in FIG. 1.
Figure 7:
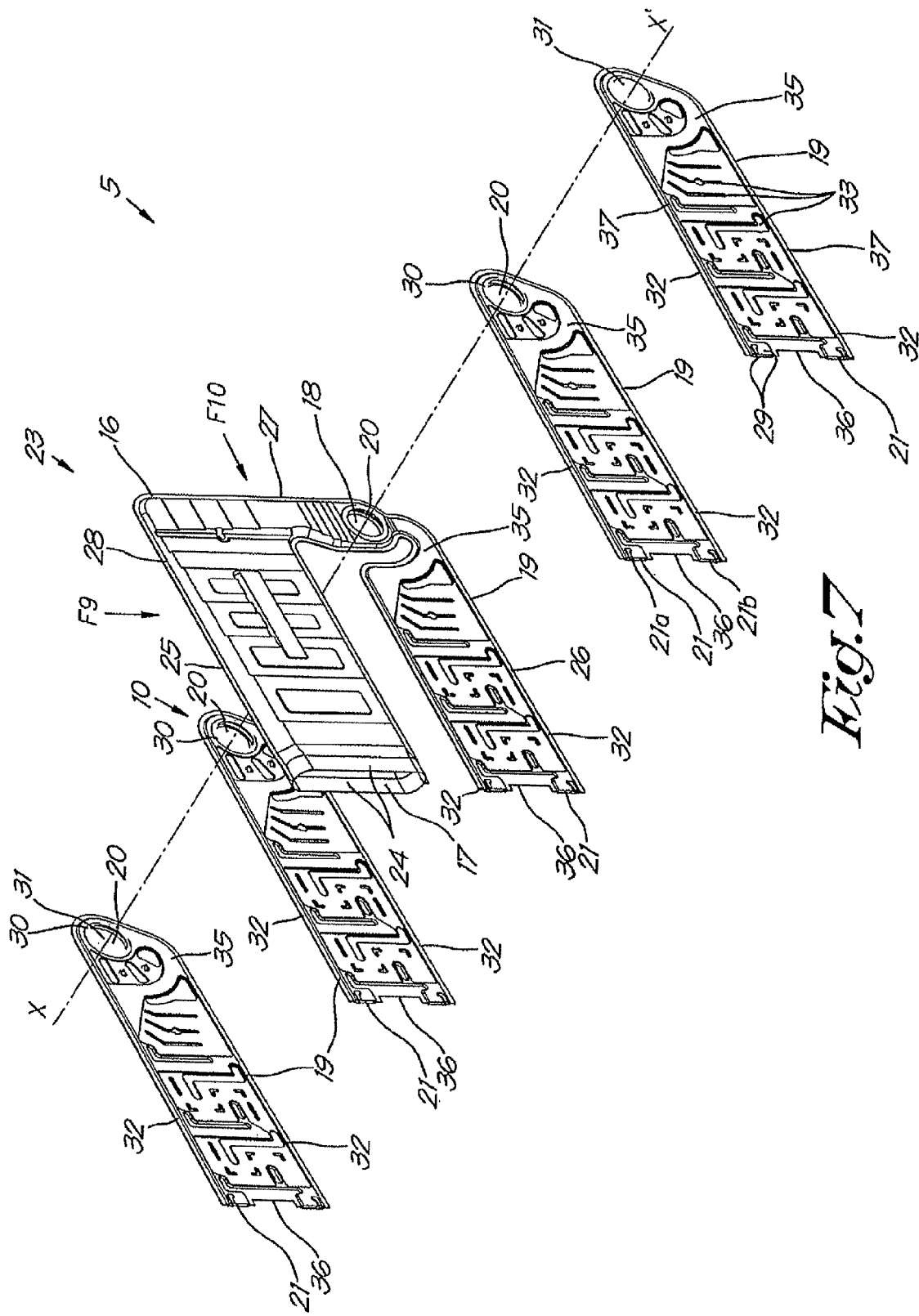
FIG. 7 shows the segment of FIG. 6 in an exploded state.
Figure 8:
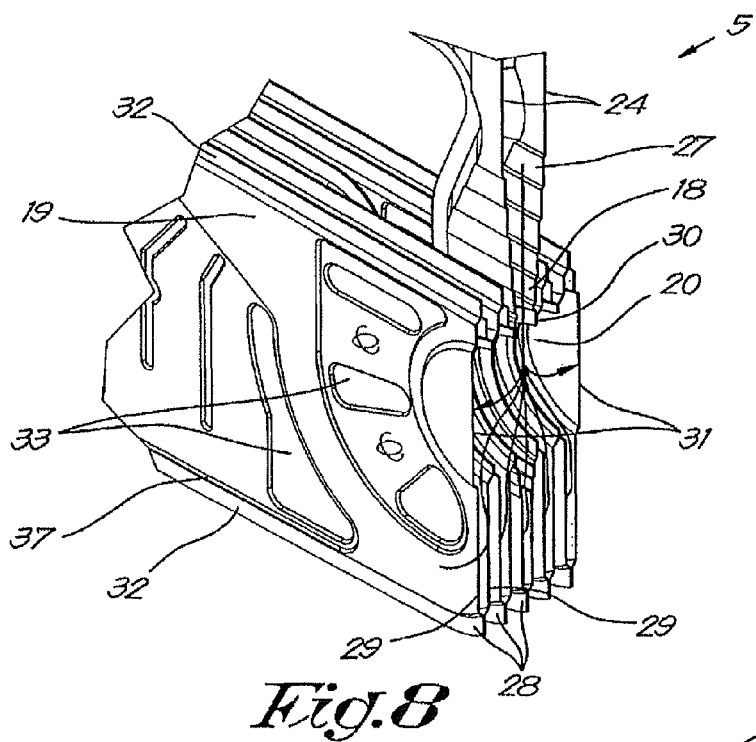
FIG. 8 shows a 3D cross-section according to the line VIII-VIII in FIG. 6.
Figure 9:
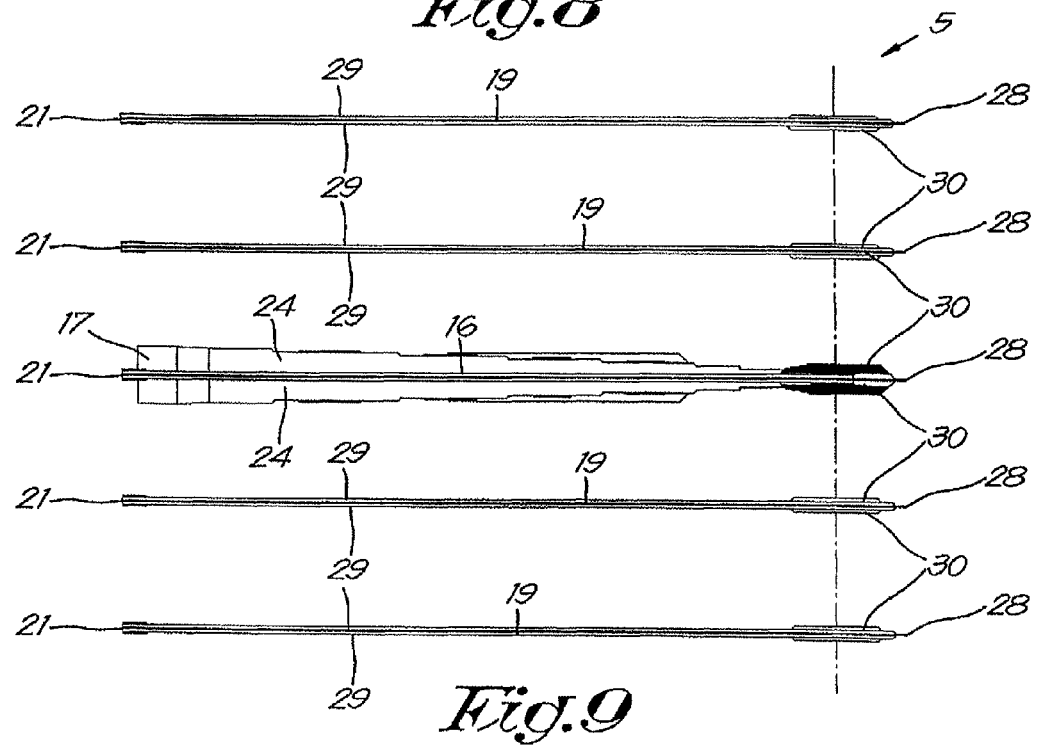
FIGS. 9 and 10 show a view, respectively according to the arrows F9 and F10 in FIG. 6.
Figure 10:
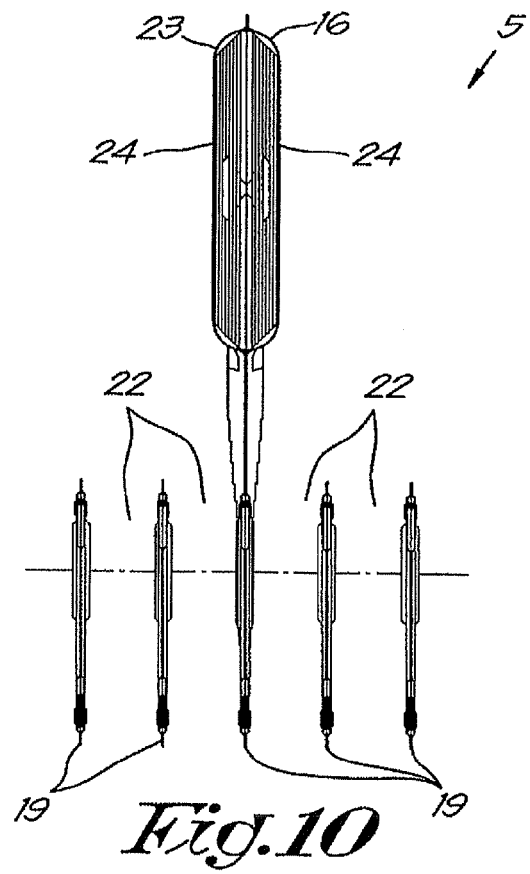

In the example shown, each segment 5, one of which is illustrated in FIG. 6, consists of a single primary element 16 with an input 17 and an output 18, which forms part of the primary section 14 of the segment 5, and five secondary condensing elements 19, each with an input 20 and an output 21, that form part of the secondary condensing section 15 of the segment 5.

Each secondary condensing element 19 is connected by its input 22 in parallel to the output 18 of the primary element 16 in such a way that the gas flow coming from the primary element 16 is uniformly divided over the secondary condensing elements 19 connected to it.

The inputs 17 of the primary elements 16 start from a common inlet collector 3 that keep the inputs 17 in place with respect one another, while the outputs 21 of the secondary condensing elements 19 connect to a common outlet collector 9 that keeps the outputs 21 mutually in their place.

The aforementioned primary and secondary elements 16 and 19 are essentially constructed in sheet form, i.e. with a small thickness of a few millimeters up to a few cm's for example, and essentially extending according to a plane, which not does not necessarily mean that the elements 16-19 are completely flat.

Thus for example the distance between centres of the secondary elements can be 10 mm while the distance between centres of the primary elements of a number of segments can be 50 mm.

The secondary condensing elements 19 are connected next to or against one another according to a sandwich structure, in such a way that flow channels 22 are formed between these condensing elements for the airflow B to be heated.

The primary element 16 is constructed as an integrated part of a double element 23 that contains a primary element 16 and a secondary condensing element 19, and which is built as a two-walled whole from two preformed shells 24 that are affixed together to form a flow channel with an input 17 for the primary element 16; an output 21 for the secondary condensing element 19, and, at the location of the transition between the primary element 16 and the secondary condensing element 19, a branch opening 18-20 that overlaps and acts as an output 18 of the primary element 16 and as an input 20 for the secondary condensing element 19 and to which the other secondary condensing elements 19 can be connected.

The double element 23 is formed from two essentially U-shaped shells 24 to form an essentially U-shaped element with two arms 25 and 26 that are connected by a connection 27, whereby one arm 25 forms part of the primary element 16 and the other arm 26 forms part of the secondary condensing element 19 of the double element 23.

The shells 24 are preformed for example by cutting and stamping from stainless steel or other anti-rust treated sheet material, and are connected together by a gastight joint along their edges, except at the location of the inputs and outputs, which is preferably produced by laser welding, although other joining techniques such as folding are not excluded.

Laser welding offers the advantage that the welded joint can be realised at a high speed and with high accuracy.

Analogously, the other secondary condensing elements are formed as a two-walled whole that is composed of two preformed shells 29 that are affixed together to form a flow channel with an aforementioned input 20 and output 21.

The inputs 20 of the secondary condensing elements 19 are constructed with a thickened edge 30 with which the condensing elements 19 are mounted against one another and are connected together by a connection along this thickened edge 20.

The shells 29 of the secondary condensing elements 19 have an opening at the location of the inputs 20, except for the outermost shells 29 of the outermost elements 19 where the sheet is continuous as a type of cover 31.

The secondary condensing elements 19 essentially have the same shape with two opposite essentially straight edges 32 that border the flow channel 6 and which extend up to the output 21 of the secondary condensing element 19 concerned, whereby these edges 31 diverge towards the output 21.

Figure 5:
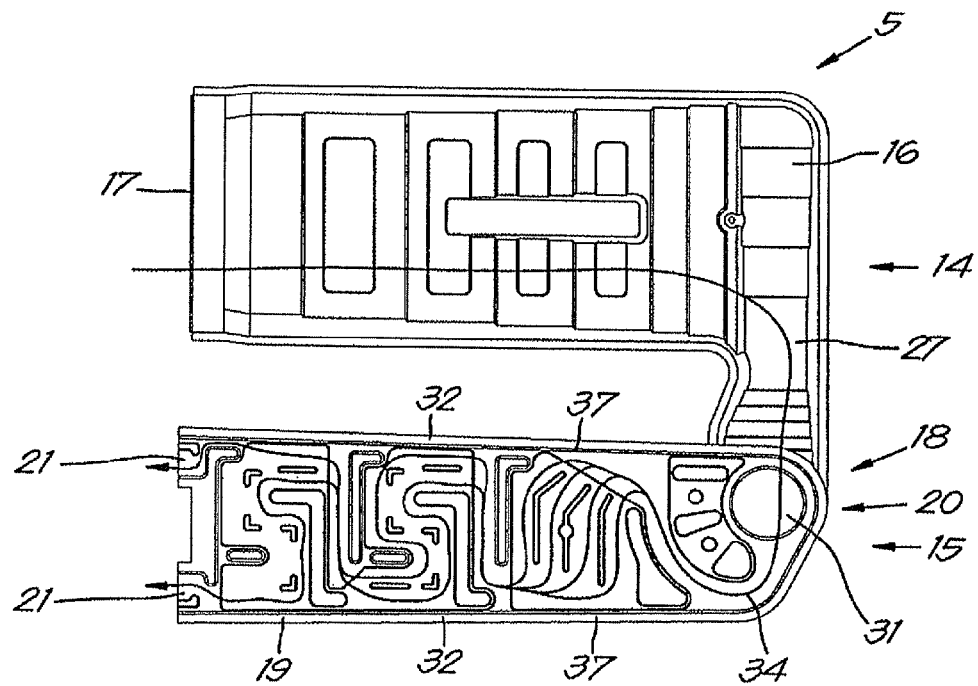
FIG. 5 shows a view of the heat exchanger according to the arrow F5 in FIG. 1.

A relief structure is formed in the preformed shells 29, which upon assembly forms guide walls and partitions 33 between the shells 19 that define a flow channel 6 that guides the gases, as illustrated in FIG. 5, according to a type of irregular zigzag route 34 through the secondary condensing elements 19, and this route 34 extends from the one edge 32 to the other edge 32, and this route 34 is connected to the input 20 of the secondary condensing element 19 concerned via a swan-neck shaped channel section 35.

The relief structure is such that the zigzag route 34 divides into a number of sub-routes or channels that again converge in the secondary condensing element 19 to be able to divide again if need be, as shown in FIG. 5.

In this way, in the example shown the flow channel 6 at the output 21 of the secondary condensing element 19 is divided into two part channels, each with a part output 21a and 21b separated by a connection 36 of the edges of the shells 29 at the output 21 of the condensing element 19 concerned.

In the secondary condensing elements 19 two drainage channels or grooves 37 are provided for the removal of condensation, and these drainage channels 37 essentially extend along the aforementioned opposite edges 32 up to the part outputs 21a-21b of the condensing element 19 concerned, whereby the drainage channels 37 mutually connect the branches of the zigzag shaped channel section or route, so that the condensation that arises in the zigzag-shaped route 34 can always find a way out to one of the drainage channels 37, and this almost irrespective of the spatial orientation of the heat exchanger 1.

Figure 11A:
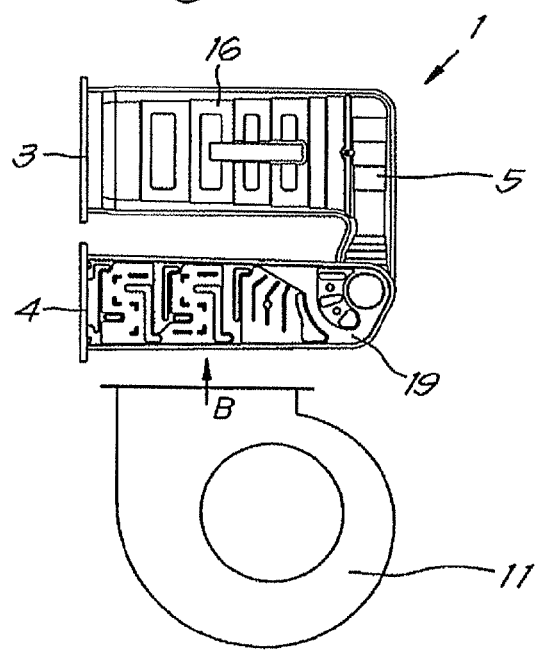
FIGS. 11A TO 11C show different possible orientations of a heat exchanger according to FIG. 1.
Figure 11B:
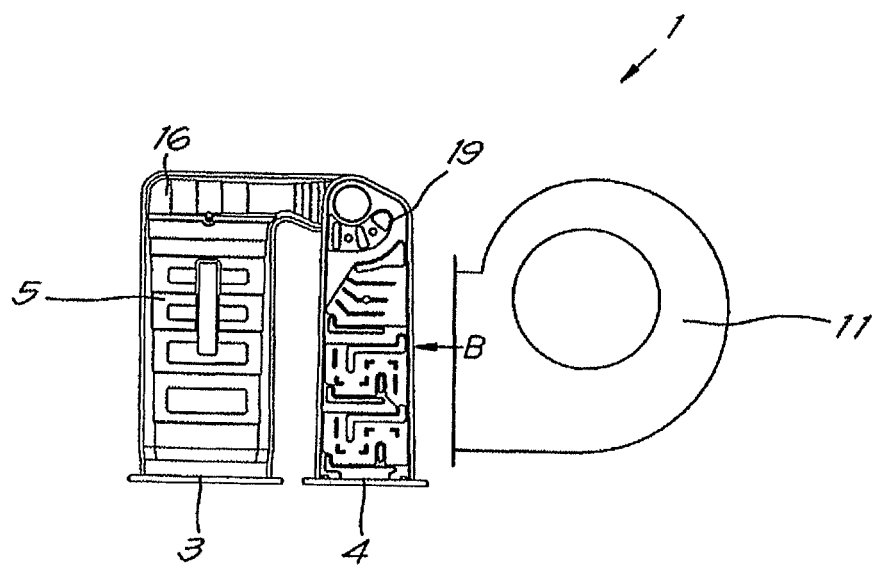
Figure 11C:
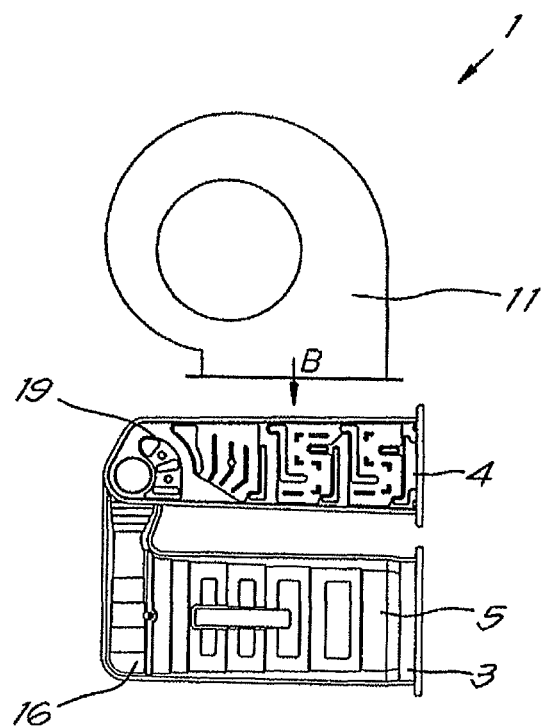

This is illustrated for example in a side view for different orientations of the heating appliance, more specifically with vertically arranged elements 16-19 and an upward oriented airflow B, as shown in FIG. 11A in a position in which the heating appliance 1 will normally be used, respectively in a position with a downward oriented airflow B, as shown in FIG. 11C, whereby the heating appliance 1 is turned 180°, upside down with respect to the position of FIG. 11A, around a horizontal axis X-X' perpendicular to the plane of the elements 16-19, and finally a horizontal airflow B in FIG. 11B in an intermediate position whereby the heating appliance 1 of FIG. 11A is turned 90° around the X-X' axis.

It is clear that in all these positions and intermediate positions, the condensation can flow away without it accumulating in the heat exchanger 2.

It is also possible that the heating appliance 1 is tilted sideways around a horizontal axis perpendicular to the X-X' axis without condensation accumulating in the heat exchanger 2.

It is clear that the number of segments 5 can vary depending on the desired power and that for each segment 5 the number of elements 16 and 19 can also vary according to the desired efficiency, which can be increased by increasing the number of secondary condensing elements 19.

The segments 5 do not necessarily have to be symmetrical with respect to the double element 23, whereby the number of secondary condensing elements 19 on either side of the double element 23 do not necessarily have to be the same, and whereby all secondary condensing elements 19 connected to the double element 23 can even be located on one and the same side of the double element 23.

For the rest it is not excluded that the segments 5 contain more than one double element 23.

The present invention is by no means limited to the embodiment described as an example and shown in the drawings, but a heat exchanger and a heating appliance according to the invention can be realised in all kinds of variants, without departing from the scope of the invention.

The invention claimed is:

1. A heat exchanger for a high efficiency hot air heating appliance, comprising:
   at least one segment arranged to form a flow channel with an inlet and an outlet for hot combustion gases, said at least one segment comprising a primary section and a secondary condensing section coupled to the primary section following in the flow direction of the combustion gases,
   said segment further comprising at least one primary element having an input and an output configured to form part of the primary section of the segment and at least two secondary condensing elements coupled to the at least one primary element to form part of the secondary condensing section of the segment, each of said at least two secondary condensing element having an input and output,
   wherein said at least one primary element is integrally formed with one of the at least two secondary condensing elements being constructed from a double element,
   wherein said double element comprises a branch opening at a location of a transition between the output of the at least one primary element and the input of the one of the at least two secondary condensing elements, and to which the inputs of the other secondary condensing elements of the segment are connected in parallel in such a way that gas flow coming from the at least one primary element is divided between the at least two secondary condensing elements coupled to the at least one primary element, wherein flow channels for air to be heated are disposed between the at least two secondary condensing elements, and wherein the double element is formed as a two-walled whole from two preformed shells that are affixed together to form the flow channel so that said double element comprises the input for the at least one primary element, the output for the one of the at least two secondary condensing elements coupled to the at least one primary element, and the branch opening at the location of the transition between the at least one primary element and the one of the at least two secondary condensing elements.

2. The heat exchanger according to claim 1, wherein the at least one primary and at least two secondary elements are constructed in sheet form and the secondary condensing elements are configured to be connected together in the manner of a sandwich structure.

3. The heat exchanger according to claim 1, wherein the inputs of the at least one primary element is connected to said inlet and the outputs of the at least two secondary condensing elements are connected to the outlet.

4. The heat exchanger according to claim 1, wherein the other of the at least two secondary condensing elements are formed as a two-walled whole that comprise two preformed shells that are affixed together to form a flow channel with said input and output.

5. The heat exchanger according to claim 4, wherein the two-walled elements are connected together along edges thereof, except at the location of the inputs and outputs, by a gastight connection.

6. The heat exchanger according to claim 1, wherein the at least two secondary condensing elements have the same shape, including two opposite essentially straight edges that border the flow channel and which extend up to the output of the respective secondary condensing element.

7. The heat exchanger according to claim 6, wherein the opposite edges diverge towards the output.

8. The heat exchanger according to claim 6, wherein the flow channel in the secondary condensing elements contain a section that extends according to an zigzag-shaped route between the opposite edges.

9. The heat exchanger according to claim 8, wherein the flow channel in the secondary condensing elements contains a section that connects the zigzag-shaped channel section to the input of the respective secondary condensing element.

10. The heat exchanger according to claim 8, wherein the zigzag route in the secondary condensing elements divides into a number of part channels that converge in the secondary condensing element to be able to enable their being selectively divided.

11. The heat exchanger according to claim 10, wherein the zigzag route at the output of the secondary condensing element is divided into a number of part channels, each part channel including a part output separated by a welded joint of the edges of the shells at the output of the respective condensing element.

12. The heat exchanger according to claim 6, wherein the secondary condensing elements comprise at least two drainage channels or grooves of configured to remove condensation, said drainage channels extending along the opposite edges to the output of the respective condensing element.

13. The heat exchanger according to claim 12, wherein the drainage channels mutually connect the branches of a zigzag route.

14. The heat exchanger according to claim 1, wherein the double element is essentially U-shaped with two arms connected by a connection, with one arm forming part of the at least one primary element and the other arm forming part of the one of the at least two secondary condensing elements of the double element.

15. The heat exchanger according to claim 1, wherein the elements are made of stainless steel.

16. The heat exchanger according to claim 1, wherein the heat exchanger contains two or more of said at least one segment that are arranged next to one another.

17. A high efficiency hot air heating appliance comprising a heat exchanger with an inlet and an outlet, a burner opposite the inlet and a fan to blow air over or around the heat exchanger, and the heat exchanger recited in claim 1.

18. The high efficiency hot air heating appliance according to claim 17, wherein the burner is a burner that burns gaseous fuels.

* * * * *